No. 746,938. PATENTED DEC. 15, 1903.
W. L. R. EMMET.
ELASTIC FLUID TURBINE.
APPLICATION FILED DEC. 3, 1902.
NO MODEL. 6 SHEETS—SHEET 2.

Witnesses: George A. Thornton, Alex. F. Macdonald.

Inventor: William L. R. Emmet, by Albert G. Davis, Att'y.

No. 746,938.  
W. L. R. EMMET.  
ELASTIC FLUID TURBINE.  
APPLICATION FILED DEC. 3, 1902.

PATENTED DEC. 15, 1903.

NO MODEL.  
6 SHEETS—SHEET 3.

Witnesses:  
George A. Thornton  
Alex. F. Macdonald

Inventor:  
William L. R. Emmet,  
by Albert G. Davis,  
Att'y.

No. 746,938. PATENTED DEC. 15, 1903.
W. L. R. EMMET.
ELASTIC FLUID TURBINE.
APPLICATION FILED DEC. 3, 1902.
NO MODEL. 6 SHEETS—SHEET 6.

Witnesses: Inventor:
George A. Thornton. William L. R. Emmet,
Alex F. Macdonald. by Albert G. Davis,
Atty.

No. 746,938. Patented December 15, 1903.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELASTIC-FLUID TURBINE.

SPECIFICATION forming part of Letters Patent No. 746,938, dated December 15, 1903.

Application filed December 3, 1902. Serial No. 133,679. (No model.)

*To all whom it may concern:*

Be it known that I, WILLIAM L. R. EMMET, a citizen of the United States, residing at Schenectady, county of Schenectady, State of New York, have invented certain new and useful Improvements in Elastic-Fluid Turbines, of which the following is a specification.

The present invention relates to elastic-fluid turbines, and has for its object to improve and simplify their construction.

For a consideration of what I consider to be novel and of my invention attention is called to the accompanying description and the claims appended thereto.

Figure 1:
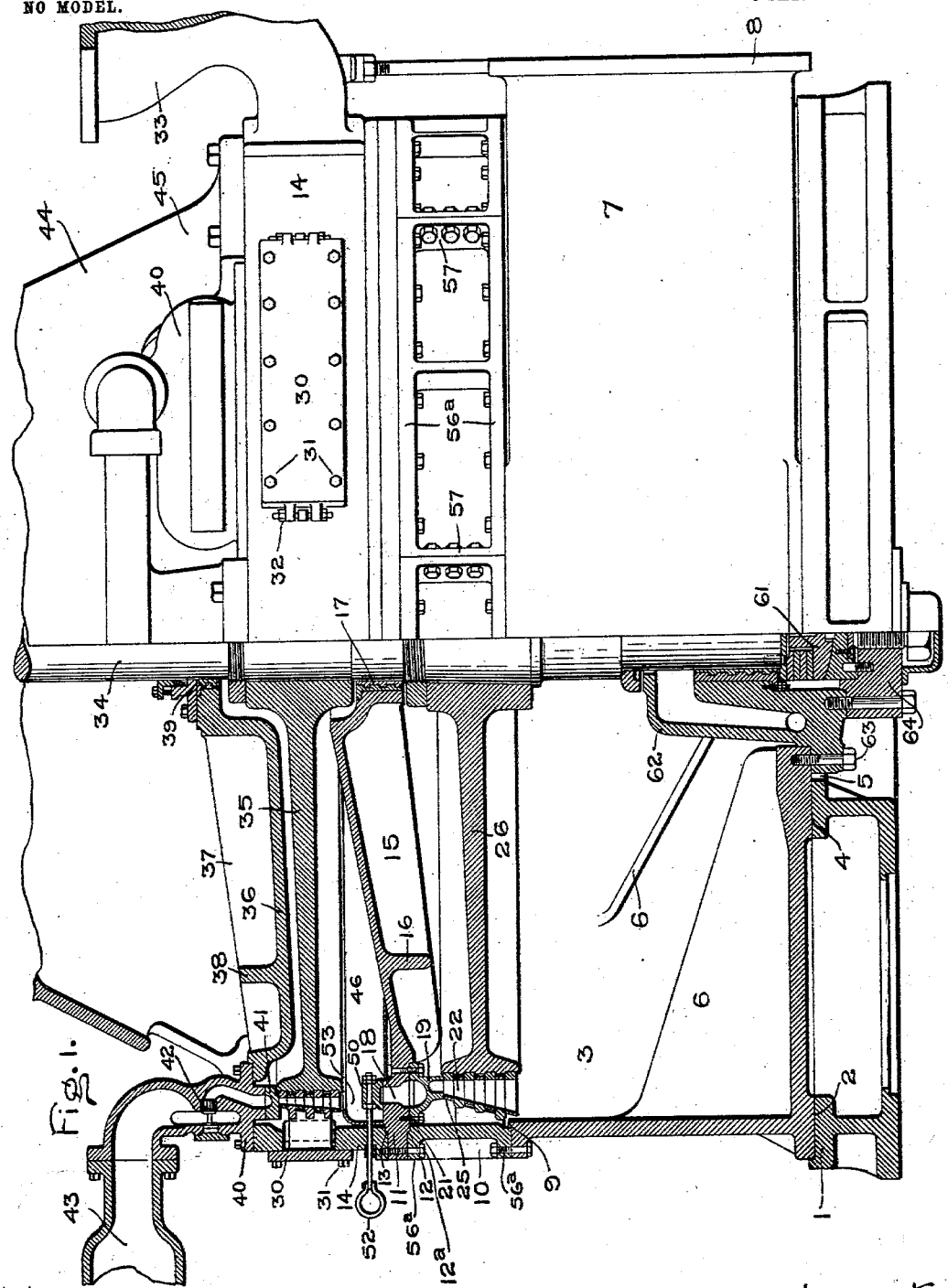
Figure 2:
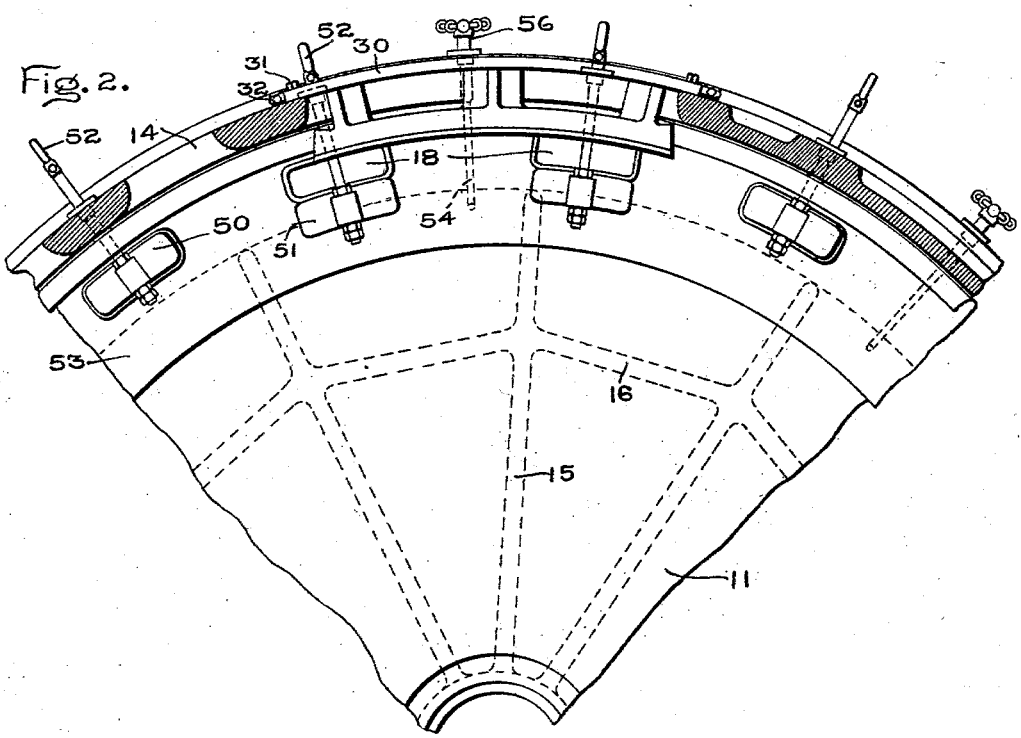
Figure 3:
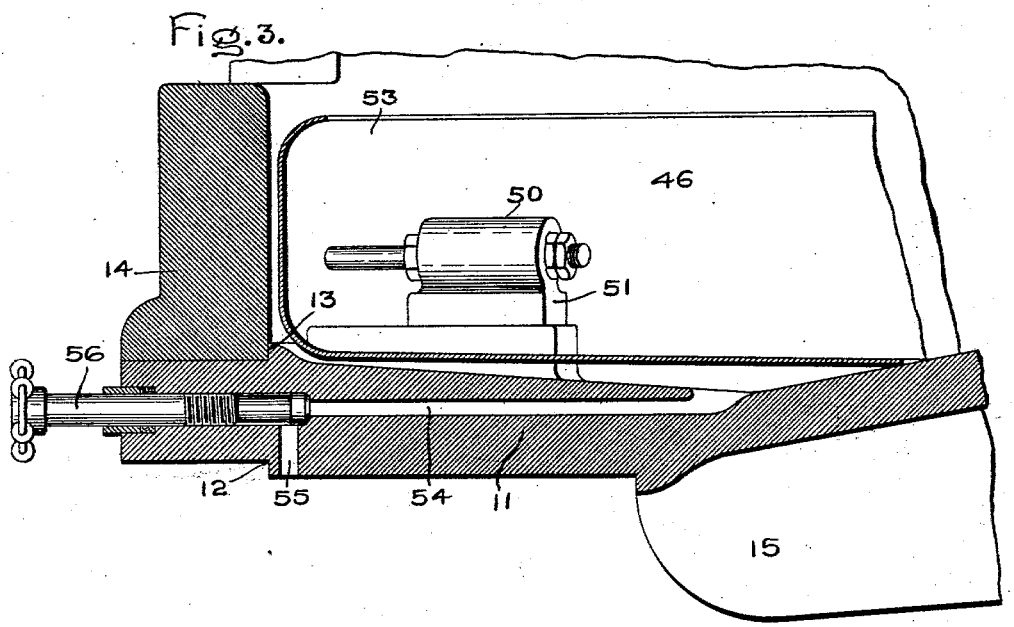
Figure 4:
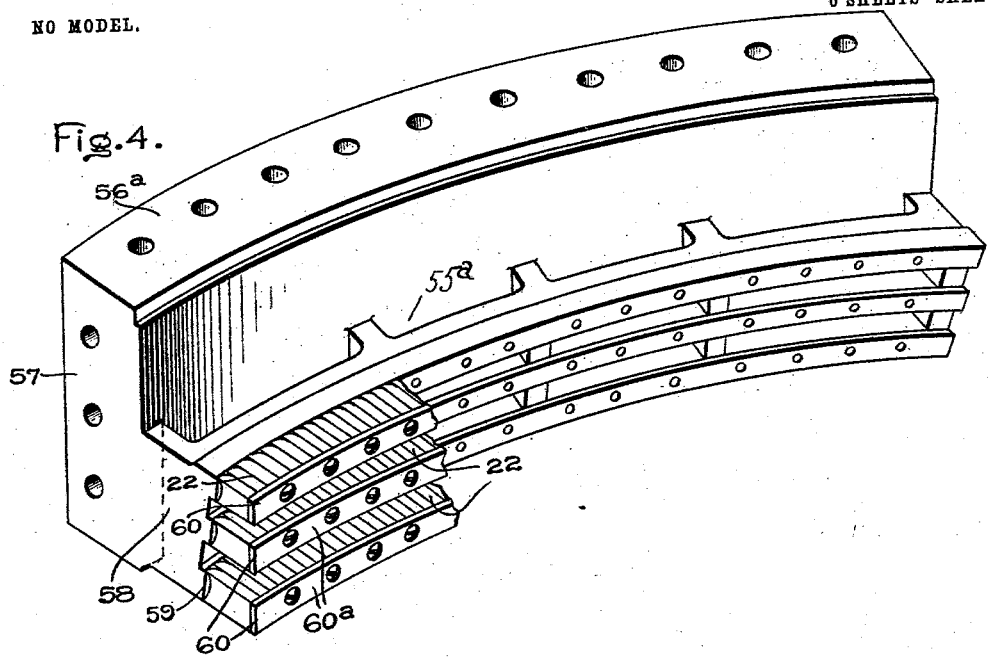
Figure 5:
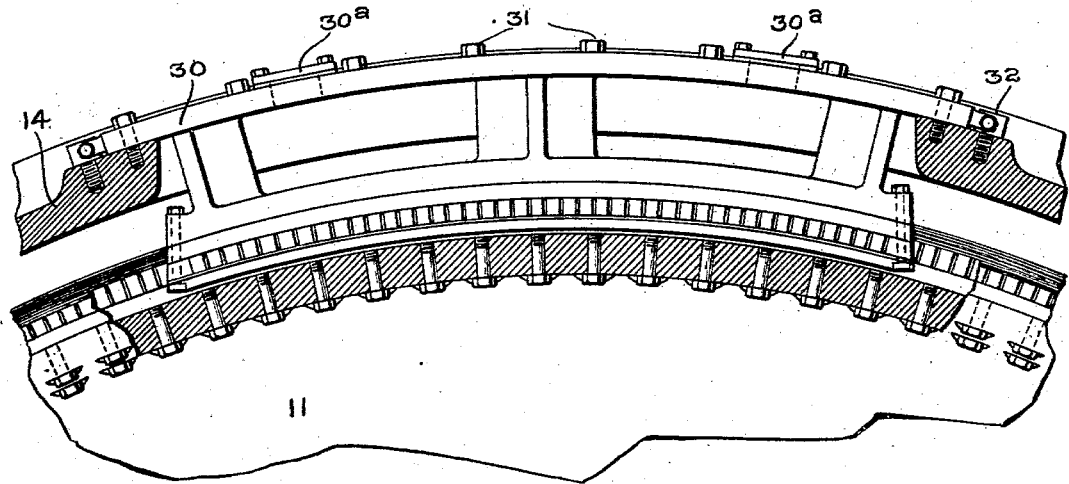
Figure 6:
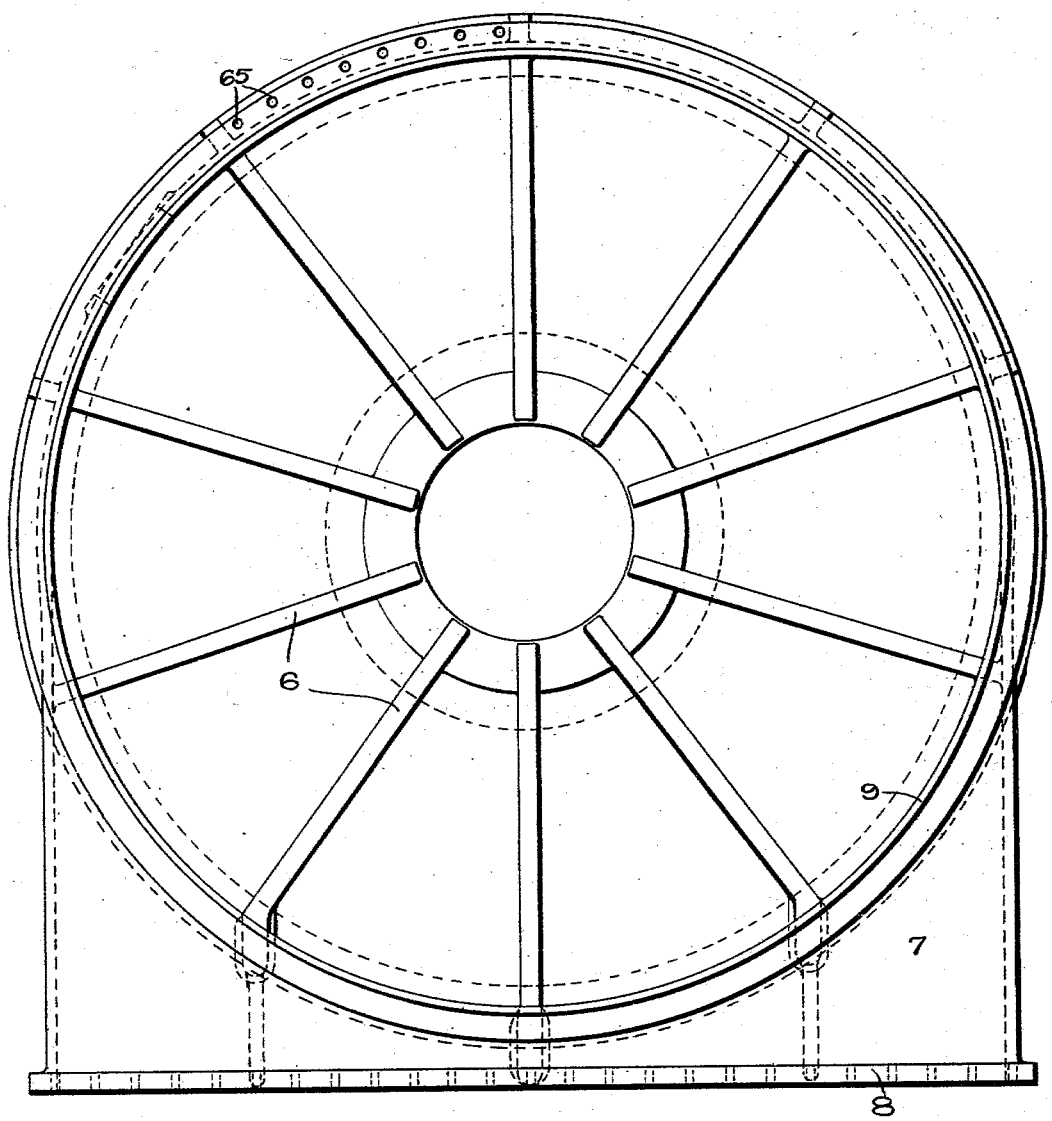
Figure 7:
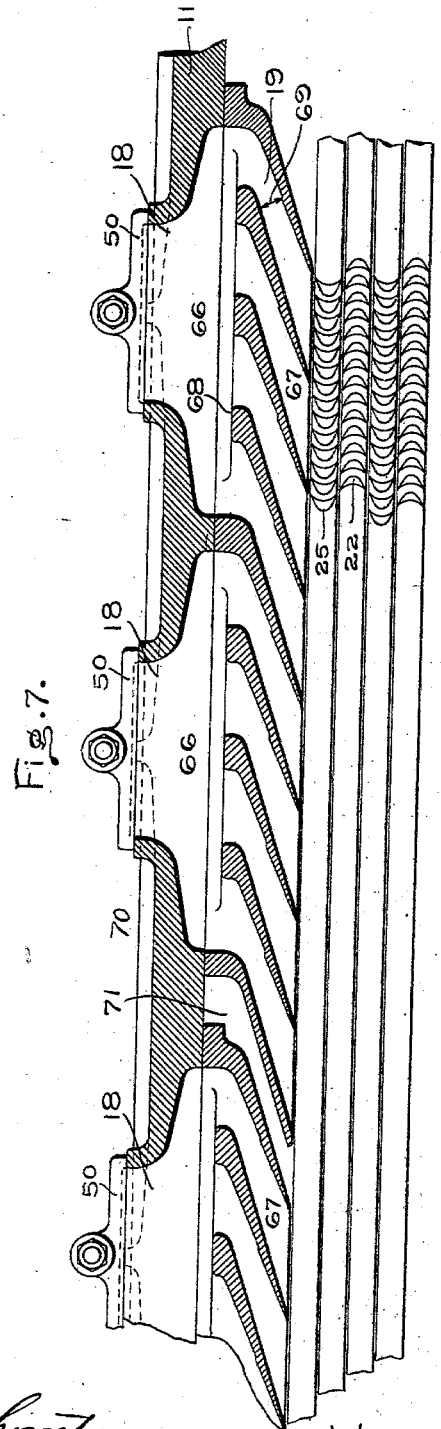
Figure 8:
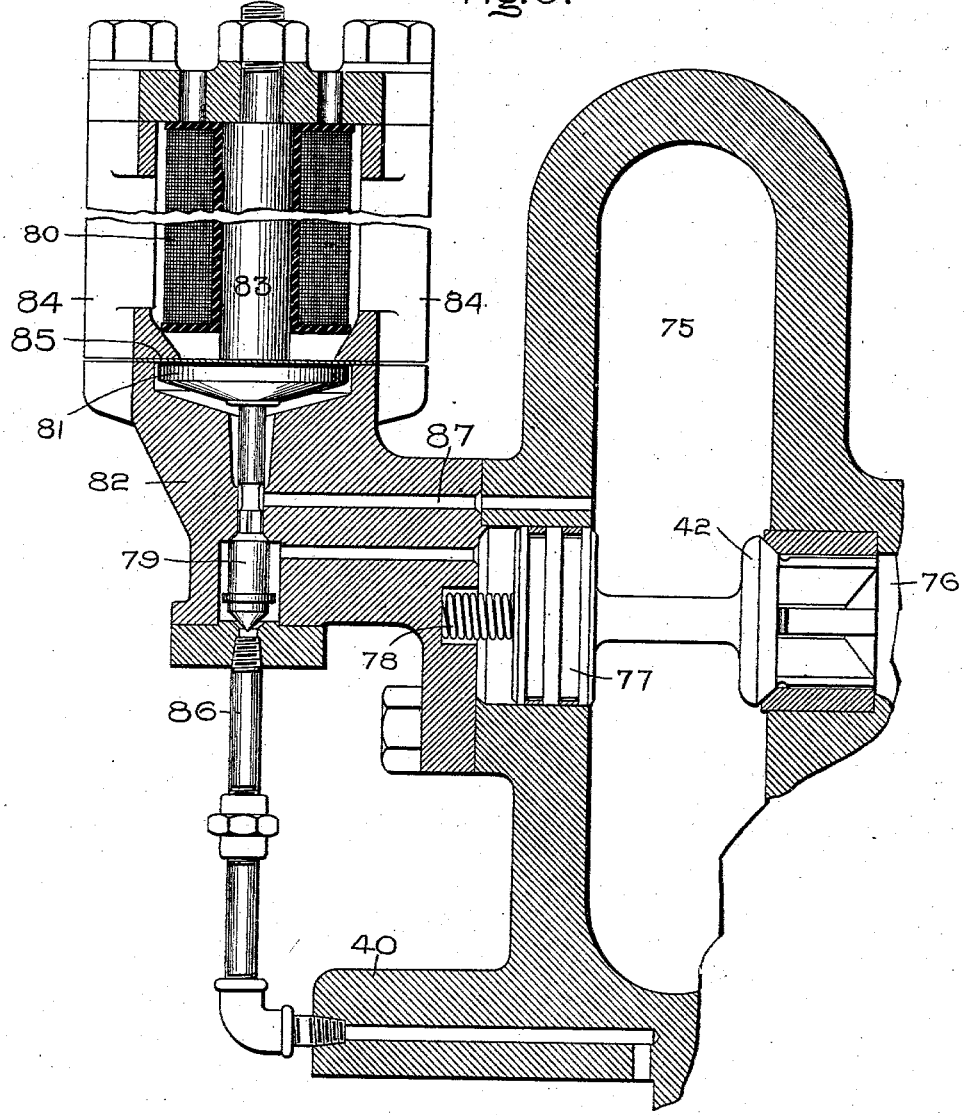

In the accompanying drawings, which represent an embodiment of my invention, Figure 1 is an elevation, partly in section, of an elastic-fluid turbine. Fig. 2 is a partial horizontal section. Fig. 3 is a partial vertical section. Fig. 4 is a perspective detail view showing one of the supports for the intermediates for the second stage. Fig. 5 is a detail view showing the relation between the intermediates of the first stage and the bucket-wheel. Fig. 6 is a plan view showing the condenser-chamber. Fig. 7 is a developed section of a part of the nozzle-sections and buckets of the second stage, and Fig. 8 is an enlarged view of one of the automatic valves for cutting a nozzle-section into or out of service.

Referring to Fig. 1, 1 represents the base or bed plate of the machine, which is adapted to be placed on a masonry foundation and is provided on its upper surface with a shoulder 2, that is adapted to receive the base of the condenser-chamber 3. It is also provided with a finished surface 4, which assists in sustaining the central part of the condenser-chamber and is located adjacent to the step-bearing, which supports the main driving-shaft of the turbine. A central opening 5, which is somewhat larger than the greatest external diameter of the step-bearing, is also provided, so that the bearing can be removed without in any way interfering with the base. The condenser-chamber 3 is provided with finished under surfaces that engage with the surfaces 2 and 4 of the base. It is also provided with a plurality of radially-extending strengthening-ribs 6. Extending outwardly from the condenser-chamber is a connection 7, that leads to the condenser proper. It extends the entire width of the condenser-chamber and affords an unrestricted passage for the steam or other elastic fluid employed to drive the turbine. It also affords an opening by means of which a man can get into the casing for the purpose of inspection or repair. The connection is provided at its end with a flange 8, by means of which it can be bolted to a corresponding flange on the condenser or on a conduit leading thereto. The upper end of the condenser-chamber is faced off true and is provided with a shoulder 9, arranged to receive he segmental ring 10, that forms a part of he casing for a low-pressure stage. In the present illustration the condenser-chamber supports the second stage. Situated above the segmental ring 10 is a diaphragm 11, which is provided with lower and upper shoulders 12 and 13. The shoulder 12 is adapted to receive the segmental casing-ring 10, while the shoulder 13 engages with the ring 14, that forms a part of the casing of the first stage. The diaphragm is arched, as shown in Fig. 1, in order to resist the pressure exerted on it by the fluid in the first stage and is strengthened by radially-extending ribs 15 and by webs 16, that connect the ribs. The pressure on the diaphragm will vary somewhat for different turbines. In the one shown the pressure is due to the difference between atmosphere and the vacuum due to the condenser. The diaphragm is provided with a central hub, through which the main shaft extends, and between it and the main shaft is a suitable packing 17, that prevents the motive fluid from passing from the first to the second stage at this point. The diaphragm is provided with a plurality of openings 18, which are preferably, although not necessarily, spaced equidistant. Bolted to the diaphragm under these openings are nozzles 19, preferably of the expanding type. These nozzles are made in sections and so arranged that they can be removed from the under side of the diaphragm by removing the bolts 21.

In turbines of the jet type it is necessary to provide intermediate buckets—such as 22, for example—for the purpose of reversing the direction of motive fluid received from the adjacent moving buckets 25 and delivering it to the succeeding bucket in the proper direction. In the first stage the intermediate buckets occupy only a relatively small amount of the total angular space around the wheel; but in the second stage, where a greater volume of motive fluid has to be handled, it becomes desirable to have these intermediates cover the larger portion of the wheel. It is also advantageous to use a relatively large number of buckets in the low-pressure or second stage, because by so doing the cost of cutting the wheel-buckets is materially reduced. The increase in the number of intermediate or stationary buckets due to the increased arc covered by them is more than compensated for by the fact that the working passages are not so deep.

In order to remove the intermediate buckets, whether for the purpose of inspection or repair or for the purpose of inspecting or repairing the bucket-wheel 26 of the second stage, the ring-like casing 10 is made in sections. This is made necessary by the fact that the moving and stationary buckets interlock. The sections are bolted together and also to the diaphragm above them and to the casing of the condenser-chamber beneath. By removing the bolts one section or another can be removed by moving it outward in a radial direction from the center of the main shaft, and this without in any way disturbing the position of the other parts. Another reason for making this casing in sections is that with a machine of the size illustrated — namely, five thousand kilowatts—it becomes inconvenient to remove the generator and the casing for the first stage, its wheel and diaphragm, when it becomes necessary to get at the second-stage intermediates or the second-stage nozzles. It is also impractical to make large openings in a continuous ring and remove the intermediates in the manner to be hereinafter described in connection with the first stage because of the strain thereon and the great weight of the parts of the machine situated above it. The number of sections of which the low-pressure casing is composed varies with the size of the turbine. In the present illustration the sections weigh about a thousand pounds apiece. For convenience and simplicity of construction the bolts 12$^a$ are arranged to pass through the sections of the casing of the second stage—the diaphragm—and into the casing or ring 14 of the first stage.

The casing for the first stage is preferably made in a continuous ring on account of simplicity of construction and reduction in the amount of machine-work required. It can, however, be made the same as the casing for the second stage, if desired. It is provided with a plurality of detachable intermediate bucket-supports 30. These supports are movable in a plane parallel with the driving-shaft for the purpose of adjusting the clearances between the intermediate and the revolving buckets. They are normally clamped in place by bolts 31. When it becomes necessary to change the adjustment of the intermediate, the bolts 31 are loosened and the adjusting means 32 moved in the proper direction to raise or lower the intermediates as a whole. The number of the sets of intermediate buckets can be varied to suit the requirements.

Bolted to the casing for the first stage is a fluid-carrying conduit 33, which is employed when the machine is running non-condensing. In a case of this kind the nozzle-openings into the second stage would be cut out of service. Mounted on the main shaft 34 of the machine is a bucket-wheel 35 for the first stage. This is so situated with respect to the intermediates that motive fluid will be directed against its buckets in the proper manner. Situated above the first-stage wheel is a cover 36 of suitable construction. It conforms closely to the shape of the wheel 35 in order to reduce the size of the chamber between it and the wheel and is strengthened by radially-extending ribs 37 and webs 38, that connect the ribs. In the center is an opening to receive the shaft 34, and the escape of motive fluid from the upper side of the wheel to the atmosphere is prevented by a packing 39. Near its periphery the cover is provided with a plurality of openings that are arranged to receive the nozzle-supports 40. The openings and supports are preferably spaced equidistant, and the supports are seated on the cover and retained in place by bolts. To the under side of each of these supports is detachably secured a nozzle 41, that receives motive fluid from the source of supply and after converting more or less of its pressure into velocity delivers it to the buckets of the first wheel. Mounted in the supports 40 are separately-actuated valves 42, that control the passage of motive fluid into the nozzle. The support 40 is also provided with a flange to which the fluid-carrying conduit 43 is bolted.

44 represents the lower part of the casing of a dynamo-electric machine and is provided with feet or supports 45, which rest on the upper surface of the cover and are bolted thereto. In the openings formed between the feet or supports are situated the nozzle-supports 40, together with the fluid-controlling valves 42.

It will be noted that the casing 14 of the first stage engages directly with the diaphragm 11 and that the casing of the second stage engages directly with the under side of said diaphragm. By reason of this construction a chamber 46 is provided, into which the motive fluid from the buckets of the first stage is discharged. The fluid is collected in this chamber and the pressure of the several streams equalized and then delivered to the second-stage nozzles, where the pressure is again converted wholly or partially into velocity and delivered to the buckets of the second stage.

It is my intention to govern the turbine by controlling the supply of motive fluid to the several sets of sectionalized nozzles in the first stage and to permit the fluid to flow freely into the second stage without attempting to control it at this point. In order, however, to obtain the proper relation between the nozzles of the first and second stages or between any two sets of nozzles where more than two stages are employed, valves 50 are provided of a character best shown in Figs. 2, 3, and 7. Each valve comprises a flat plate 51, that is connected to a handle 52, situated outside of the casing, where it can readily be manipulated by an attendant. As shown, they are intended to be pushed inward toward the center when it is desired to uncover the opening 18; but this particular arrangement is unessential, the important thing being to cover and uncover the openings into the second-stage nozzles by a manually-actuated device at will. It is also necessary to have some means for cutting off the second-stage nozzles when it is desired to run the turbine non-condensing.

The particular machine in question is designed to receive motive fluid from the boiler at one hundred and sixty-five pounds' absolute pressure, which pressure is largely converted into velocity in the first-stage nozzles, and the velocity is abstracted by the buckets. The pressure in the intermediate chamber 46 is about sixteen pounds absolute, and when the machine is in operation the difference in pressure between this and that due to the condenser is wholly or largely converted into velocity and the velocity abstracted by the buckets of the second stage. I do not wish, however, to be understood as limiting myself to this or any other pressure.

It is desirable to remove all of the water of condensation from the turbine-casing in order to prevent its reconversion into vapor at the expense of considerable energy, and to do this a deflector 53 is provided, which is best shown in Fig. 3. It is situated between the inner wall of the second-stage casing and the second-stage valves 50. As the water is projected outward from the first-stage wheel, due to its centrifugal action, it strikes the wall and flows downward between it and the deflector. The water which drops from the intermediate buckets is also caught. The diaphragm is provided with a channel 54, which communicates with the space between the deflector and the wall of the casing. The channel 54 is connected with a passage 55, that communicates with the interior of the condenser-chamber through the spaces or passages 55ª, formed back of the intermediate bucket-support, Fig. 4. In this manner the water is conveyed or shunted around the intermediate buckets. The channel and passage are preferably located at a point or points between the valves of the second stage. The passage of water into the condenser-chamber is controlled by means of the valve 56, that is actuated from the outside of the casing.

It will be clearly seen from Fig. 3 that the diaphragm 11 is provided with lower and upper shoulders 12 and 13. These shoulders engage with the casings for the first and second stages and tend to resist the outward movement of the diaphragm when it is subjected to great pressure by reason of the motive fluid in the chamber 46.

In Fig. 4 is shown a section of the casing of the second stage. The one in the present illustration represents one-sixth of the total casing, but the number of these sections can be varied as desired. Each section is provided with a top and bottom flange 56ª, which is suitably machined in order to make a tight fit with the diaphragm and the casing of the condenser-chamber 3. It is also provided with end flanges 57, which are properly faced to make a tight joint with adjacent sections. On the inside of each section is a projection 58, that is provided with a beveled surface 59, to which the sections 60 of the intermediates are bolted. By making the casing in sections it is possible to do the machine-work on a relatively small machine and to assemble the sections afterward. The buckets are formed integral with the metal strip 60ª and the strips are secured to the projection on the casing-section by screws or bolts.

In Fig. 5 is shown a section of the first-stage casing 14, together with the detachable support 30 for the intermediates. It will be observed that the intermediates extend only a portion of the way around the wheel and that the support is bolted to the casing from the outside. The rows of intermediate buckets are situated between the rows of rotating buckets that are carried by the wheel. The intermediate buckets are bolted to the stationary support 30, and the wheel-buckets are bolted to the wheel. In order that the interior of the casing may be inspected for observing the relation between the moving and the stationary buckets, the support 30 is provided with openings having detachable covers 30ª. The openings are so related with respect to the parts that the clearances between buckets can readily be seen. This is of importance in adjusting the intermediates.

Referring to Fig. 1, the main shaft 34 is provided with a step-bearing 61. The bearing as a whole is inclosed in a casing 62, that extends into the condenser-chamber and is detachable from underneath. It is retained in place by bolts 63. The lower end of the bearing is supported by a block 64, that is bolted to the under side of the casing 62. The particular construction of this bearing is not claimed herein, but forms the subject-matter of a separate application.

In Fig. 6 is shown a plan view of the casing containing the condenser-chamber. The upper end of the casing is provided with a flange and a shoulder 9, the latter engaging with the sectional second-stage casing. The flange is provided with bolt-holes 65 to receive the bolts that secure the sectional casing to it. In the illustration only a few of these holes are shown; but it is to be understood that they extend entirely around the flange. The flange 8 on the projections 7 is also provided with holes for receiving bolts, the latter being employed to secure a condenser or a conduit to the condenser-casing.

Fig. 7 shows on a somewhat enlarged scale the motive parts for the second stage. The valves 50 are each provided with a flat under surface that engages with a corresponding surface on the diaphragm 11. The valves are actuated by means of handles 52, that extend outside of the casing, suitable nuts being employed to secure the handles to the valves. A considerable difference in pressure exists between the upper and under side of these valves, and in order to reduce the amount of labor necessary to actuate them to a minimum I make the passages or openings 18 as small as possible consistent with the amount of motive fluid which is to pass through them. The openings are in direct communication with subsidiary chambers 66, which rapidly enlarge as they recede from the opening. Each chamber delivers motive fluid to a plurality of nozzle openings or passages 67. In the present illustration four passages are provided for each chamber. The ends of the nozzle-partitions 68 do not extend quite to the line of division between the nozzle-section and the diaphragm. This is done in order to increase the size of the chamber 66. This chamber distributes the motive fluid to the several nozzle sections or passages and equalizes the pressure between them. Each of the nozzle-sections expands from the throat 69 to the end, and this expansion causes the pressure of the motive fluid to be converted into *vis viva* or velocity. The chambers are divided into groups of two and separated from each other by a wall 70. The nozzle-sections are bolted to the under side of the diaphragm, as is clearly shown in Fig. 1. The nozzle structure is itself divided into sections, each section in the present embodiment of my invention being provided with eight nozzle-openings; but the number can be varied, as desired. The arc covered by a nozzle-section is preferably less than that covered by a casing-section, so that the nozzle can be removed. Two chambers 66 are provided for each nozzle-section, and the end of one section overlaps that of an adjacent section. Between the sections is a small dead-space 71; but so closely are the sections associated that this can be disregarded in so far as the delivery of fluid to the wheel is concerned. The space 71 is made large enough to cause an equalization of the pressures on the wheel-faces. This space is also in communication with the space 55ª, formed in the back of the support for the intermediate buckets, Fig. 4. This avoids making holes in the wheel web or casings. Situated in front of the nozzles 70 are wheel-buckets 25 and intermediate buckets 22. For the purpose of illustration only a limited number of buckets are shown; but it is to be understood that the wheel-buckets extend entirely around the circumference of the wheel, and the intermediate buckets extend entirely or substantially around the wheel and between its rows of buckets.

Referring to Fig. 8, 42 represents one of the automatic valves which controls the passage of fluid from the chamber 75 in the steam-chest to the passage 76, leading to a nozzle-section. The valve is attached to a piston 77, working in a cylinder formed in the chest. A spring 78 is provided, which tends at all times to close the nozzle-valve 42. The movements of the nozzle-valve are controlled by a secondary valve 79, which is under the control of an electromagnet 80. The latter valve is double-acting and is arranged to engage seats situated above and below it. The valve-stem is elongated and at its upper end is provided with an enlargement or mass of magnetic material forming an armature which is acted upon by the magnet. The secondary valve is supported in a non-magnetic structure 82, the object of this arrangement being to insure the passage of the magnetic flux through the enlargement or armature 81. The magnet is provided with a core 83 and pole-pieces 84, which present their ends to the armature 81. Situated between the armature and the ends of the pole-pieces and the core is a plate of non-magnetic material 85, the object of this plate being to prevent the motive fluid from escaping and also to prevent the armature and core and pole-pieces from sticking. The electromagnet in the present figure is supposed to be energized and the secondary valve 79 is in the raised position, which cuts off the supply of motive fluid from the port 87 to the back of the piston, and the conditions are such that the nozzle-valve 42 will open, because the space back of the piston has been opened to the exhaust-pipe 86, and the area of the piston is greater than that of the nozzle-valve. When the valve is open and it is desired to close it, the electromagnet is deënergized, which permits the secondary valve 79 to drop by gravity or its equivalent and close the port leading to the exhaust, at the same time moving away from its seat on the high-pressure side, and steam from the chest will pass through the port 87 and fill the space back of the piston. In this position the pressures on opposite sides of the piston and valve are balanced and the spring 78 starts the valve into motion. As the nozzle-valve 42 approaches its seat the pressures are no longer balanced, owing to the lack of pressure in the conduit 76, and the valve quickly closes.

The invention is described in connection with a vertical turbine; but obviously the features of novelty set forth can with advantage be used with other types of machines.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a turbine, the combination of a bucket-wheel, a casing therefor comprising a number of sections, the line of division being parallel to the wheel-axis, a support to which the sections are secured, and a diaphragm which is seated on more than one of the sections.

2. In a turbine, the combination of a bucket-wheel, a casing therefor comprising a plurality of sections, each of which is removable radially, means for securing the parts of the casing together, and cylindrical supports to which opposite sides of the sections are secured.

3. In a turbine, the combination of a bucket-wheel, a casing which surrounds the wheel and is composed of sections that are radially detachable, and means separable from the casing for closing in the sides of the wheel.

4. In a turbine, the combination of a bucket-wheel, a sectional casing therefor, each of said sections being provided with a projection, and intermediate buckets which are secured to the projections.

5. In a turbine, the combination of a bucket-wheel, a sectional casing which is divided in radial planes, means for securing the sections together, and projections on the sections for supporting the intermediates which have surfaces inclined in the direction of the exhaust, substantially as described.

6. In an elastic-fluid turbine, the combination of a sectional casing, each section being provided with a curved projection, the said projections being so arranged that the bore increases in diameter toward the exhaust, intermediate buckets which are detachably secured to the projections, and a wheel having buckets which extend between the intermediate buckets.

7. In an elastic-fluid turbine, the combination of a sectional casing which surrounds the wheel, a casing which contains a chamber and supports the sections of the casing, and an extension on said casing to which a conduit may be connected.

8. In an elastic-fluid turbine, the combination of a base that is arranged to be mounted on a foundation, a casing mounted thereon which is adapted to be connected to a condenser, a bucket-wheel that is situated above the casing, a sectional casing for the wheel that is bolted to the first-named casing, and a cover for the wheel that is secured to the several sections of the wheel-casing.

9. In an elastic-fluid turbine, the combination of a casing that is provided with a shoulder on its upper surface, a sectional wheel-casing that is mounted on and engages with the shoulder, means for securing the sections of the wheel-casing together, a cover for the wheel-casing which is provided with a shoulder that engages with said sections, and means for securing the sections to the cover.

10. In an elastic-fluid turbine, the combination of a wheel, a casing therefor, a second wheel which is separated from the first by a diaphragm, fluid passages or openings formed in the diaphragm, valves for covering and uncovering the passages or openings, a separate manually-actuated means for moving each of the valves, and an expanding nozzle for each valve that is cut into and out of service thereby.

11. In a staged turbine, the combination of a casing and wheel for one stage, automatically-actuated valves for regulating the admission of fluid to the wheel, a wheel and casing for a second stage receiving motive fluid from the first, and independent manually-actuated valves distributed at different points within the casing for admitting motive fluid to a greater or less number of buckets in the second stage.

12. In a jet type of turbine, the combination of a casing and wheel for one stage, nozzle-sections for admitting motive fluid to the wheel, intermediate buckets which cover a portion only of the wheel-buckets, a second stage comprising a casing and bucket-wheel arranged to receive motive fluid from the first stage, and intermediate buckets which extend completely around the wheel.

13. In an elastic-fluid turbine, the combination of a casing and wheel for one stage, a plurality of nozzles for delivering fluid to the wheel, intermediate buckets which cover a portion only of the wheel-buckets, valves for regulating the admission of fluid to the nozzles, a casing and wheel for a second stage, nozzles arranged to receive fluid from the first-mentioned wheel and deliver it to the second, intermediate buckets which cover all of the buckets of the second wheel, and manually-actuated valves controllable from the outside of the turbine for cutting the second set of nozzles into and out of service.

14. In an elastic-fluid turbine, the combination of a first-stage wheel having a plurality of rows of buckets, a casing therefor, an expanding nozzle delivering fluid to a part only of the buckets, sectional intermediate buckets between the buckets on the wheel, a second-stage wheel that is provided with a plurality of rows of buckets, a casing therefor, a diaphragm which separates the two wheels and is subjected to the difference in pressure between the first and second stage, intermediate buckets between the rows of wheel-buckets, and passages which receive motive fluid as it is discharged from the first wheel and deliver it to the buckets of the second stage.

15. In a turbine, the combination of a bucket-wheel, a casing comprising detachable sections which surrounds the wheel, the lines of division being parallel to the wheel-axis, a cover for the casing, and nozzles which are secured to the inside of the cover and are removable through the opening formed by detaching a section of the casing.

16. In a turbine, the combination of a bucket-wheel, a casing having a detachable section, a cover for the casing which is provided with a fluid-passage, and a nozzle which is detachably secured to the inside of the cover and in line with the passage, the nozzle being removable through the opening formed by the detachable section of the casing.

17. In a turbine, the combination of a casing composed of two principal parts, one of said parts being a continuous ring, the other being made up of detachable sections, and a diaphragm that divides the casing into compartments and is provided with shoulders on opposite sides which engage with the parts of the casing.

18. In a turbine, the combination of a condenser-casing having a central opening to receive a bearing, and a base for supporting the casing which is provided with a central opening that registers with the opening in the casing through which the bearing can be removed.

19. In a turbine, the combination of a casing which is working under pressure, a bucket-wheel mounted in the casing, a passage leading from the casing through which the water of condensation is discharged due to the pressure within the casing, a valve for controlling the flow of water, and a condenser-casing which receives the exhaust from the turbine and also the water.

20. In a turbine, the combination of a casing which is divided into compartments working under different pressures, a bucket-wheel for each compartment, a passage leading from a higher-pressure compartment to a lower whereby water may be blown into the latter, and a valve for controlling the passage of water.

21. In an elastic-fluid turbine, the combination of a casing, a bucket-wheel, intermediate buckets, and a deflector situated adjacent to the wall of the casing which catches the water of condensation from the wheel.

22. In an elastic-fluid turbine, the combination of a casing, a bucket-wheel, intermediate buckets situated between the rows of wheel-buckets, a cylindrical deflector which is situated adjacent to the wall of the casing for collecting the water due to condensation, and means for drawing the water from the casing.

23. In an elastic-fluid turbine, the combination of a casing having an inclined base, a water-conveying passage formed therein, wheel and intermediate buckets, and a deflector having a cylindrical portion that extends substantially parallel with the casing-wall, and a second portion that extends substantially at right angles to the first.

24. In an elastic-fluid turbine, the combination of a bucket-wheel and its casing, a second wheel and its casing, a diaphragm which is common to the two casings, fluid-passages in the diaphragm, chambers communicating with the passages, and sectionalized nozzles which are detachably secured to the diaphragm and receive fluid from the chambers.

25. In a turbine, the combination of a bucket-wheel, a casing therefor, and nozzles arranged in sections for delivering fluid to the wheel, the nozzles of one section overlapping those of an adjacent section.

26. In a turbine, the combination of a bucket-wheel, a casing therefor, nozzles arranged in sections for discharging motive fluid to the wheel at an angle to its plane of rotation, the nozzles of one section overlapping those of a second section, and means for securing the nozzle-sections to the casing.

27. In an elastic-fluid turbine which is divided into stages, the combination of a main chamber between stages, a subsidiary chamber receiving motive fluid from the main chamber, a valve for regulating the passage of fluid from one chamber to another, and a sectionalized expanding nozzle receiving its supply of fluid from the subsidiary chamber.

28. In an elastic-fluid turbine, the combination of a wall, fluid-carrying passages formed therein and arranged in groups, and a nozzle which is divided into sections, each section receiving its supply of fluid from one of said groups.

29. In an elastic-fluid turbine, the combination of a wall which is subject to different pressures on opposite sides, fluid-carrying passages in said wall, a chamber opening into each of the passages on the low-pressure side of the wall, and a nozzle detachably secured to the wall and divided into sections, each section being arranged to receive fluid from more than a single chamber.

30. In a turbine, the combination of a casing divided into sections, a wall to which the sections are secured, a nozzle which is divided into sections, the nozzle-sections covering an arc which is less than that of the casing-sections, and means for securing the nozzle-sections to the wall.

31. In a turbine, the combination of a stationary wall, a sectional casing secured to the wall, a wheel, and a sectional nozzle that is also secured to the wall.

32. In an elastic-fluid turbine, the combination of a bucket-wheel and casing, an automatic valve for regulating the admission of fluid to the wheel, a second bucket-wheel and casing receiving motive fluid from the first, and a plurality of separately-actuated valves which are independent of the first for regulating the flow of motive fluid to the second wheel.

33. In an elastic-fluid turbine, the combination of a wheel having buckets thereon, a wheel-casing, a nozzle for delivering fluid to the wheel which is composed of a plurality of sections, and passages formed between the adjacent sections for equalizing the pressures on the wheel-faces.

34. In an elastic-fluid turbine, the combination of a bucket-wheel, a casing therefor, a nozzle which is composed of a number of separate sections, the sections being arranged to overlap, and fluid-carrying passages formed between the overlapping ends of the nozzle-sections for equalizing the pressure on the wheel-faces.

35. In an elastic-fluid turbine, the combination of a casing, a bucket-wheel mounted therein, an intermediate, and a passage for conveying water due to condensation from one side of the intermediate to the other.

36. In an elastic-fluid turbine, the combination of a high-pressure stage containing a bucket-wheel, an adjacent low-pressure stage also containing a bucket-wheel, a diaphragm between wheels, a passage for conveying the water collected by the diaphragm outward beyond the bucket-wheels, and a controllable means whereby the pressure within one stage is permitted to force the water therefrom into a lower-pressure stage.

37. In an elastic-fluid turbine, the combination of a casing, a wheel having rows of buckets carried thereby, intermediate buckets which extend entirely around the wheel, a passage located outside of the intermediate buckets, which tends to equalize the pressures on opposite faces of the wheel, and a nozzle for discharging motive fluid against the wheel-buckets.

38. In an elastic-fluid turbine, the combination of a wheel having rows of buckets carried thereby, intermediate buckets which extend entirely around the wheel, a casing, a support for the intermediates which is carried by the casing, a fluid-carrying passage formed in the casing which tends to equalize the pressure on opposite faces of the wheel, and a nozzle for discharging the motive fluid against the wheel-buckets.

39. In a turbine, the combination of a casing comprising two principal parts, one of said parts being a continuous ring, the other being made up of detachable segmental sections, the line of division between sections being in axially-extending planes, a diaphragm which divides the interior of the casing into compartments, and a shoulder between the casing and the diaphragm for supporting the latter.

In witness whereof I have hereunto set my hand this 1st day of December, 1902.

WILLIAM L. R. EMMET.

Witnesses:
EDWARD WILLIAMS, Jr.,
HELEN ORFORD.